L. H. KLEINSCHMIDT.
APPARATUS FOR PRODUCING TOPOGRAPHIC VIEWS.
APPLICATION FILED JUNE 18, 1909.
994,935.
Patented June 13, 1911.
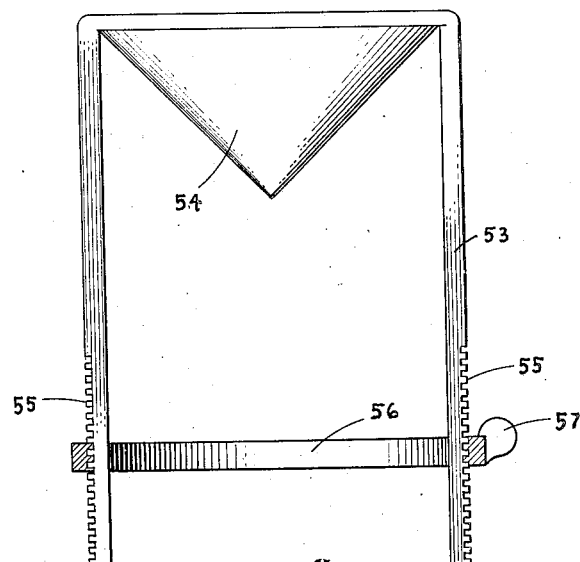
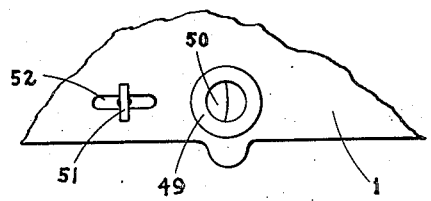
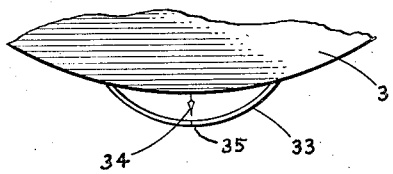
WITNESSES:
Frederic M. Keeney.
Marguerita Roche
INVENTOR:
Louis Henry Kleinschmidt.

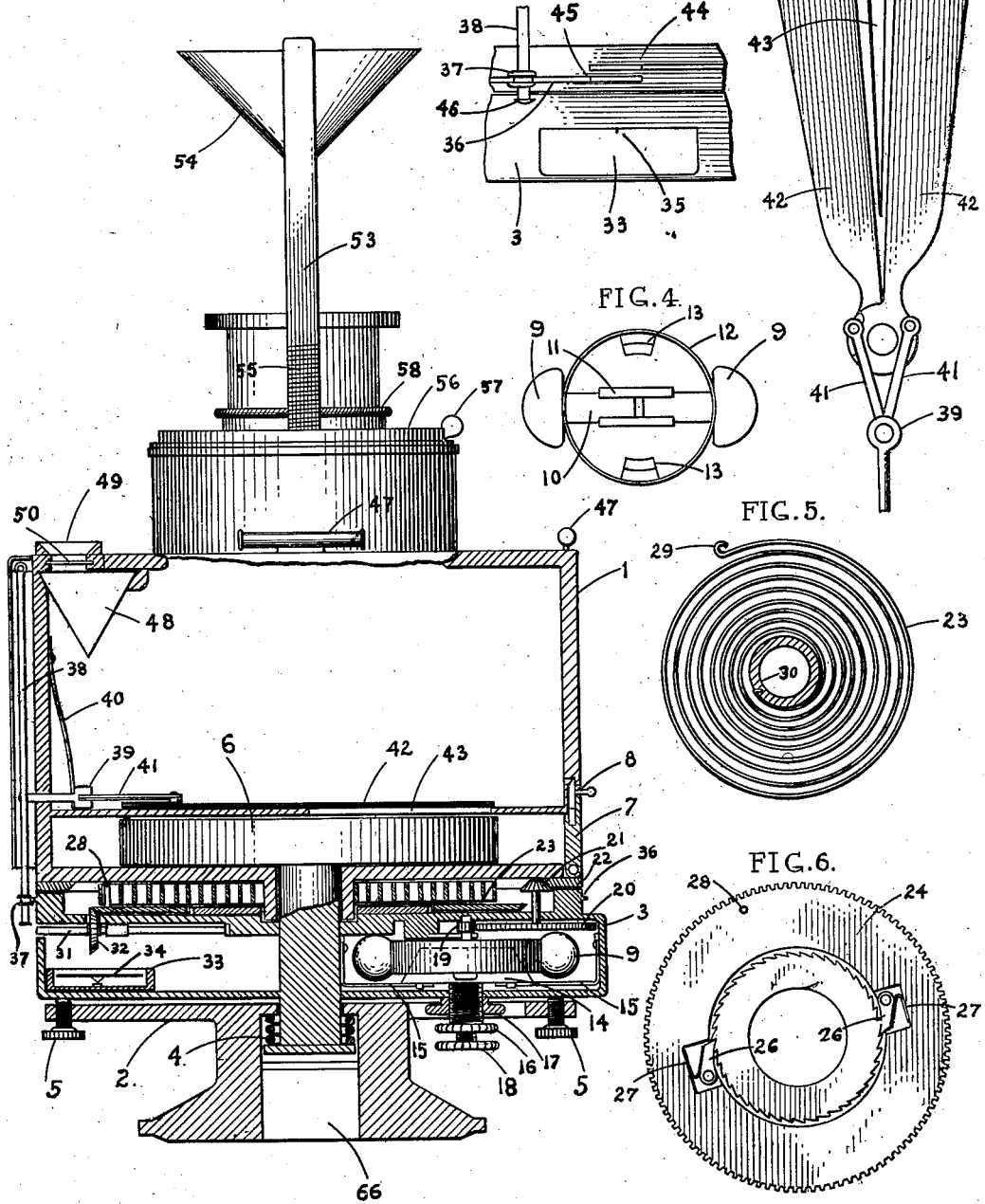

UNITED STATES PATENT OFFICE.

LOUIS HENRY KLEINSCHMIDT, OF SAN DIEGO, CALIFORNIA.

APPARATUS FOR PRODUCING TOPOGRAPHIC VIEWS.

994,935.   Specification of Letters Patent.   Patented June 13, 1911.

Application filed June 18, 1909. Serial No. 502,944.

*To all whom it may concern:*

Be it known that I, LOUIS HENRY KLEINSCHMIDT, citizen of the United States, residing at San Diego, in the county of San Diego and State of California, have invented certain new and useful Improvements in Apparatus for Producing Topographic Views; and I do hereby declare the following to be a full, clear, and exact description of the invention, such as will enable others skilled in the art to which it appertains to make and use the same.

This invention relates to apparatus for producing topographic views, and has for its object the provision of simple and efficient mechanism, adapted to expose successive portions of a sensitized photographic plate for a definite period of time.

It is more particularly a revolving camera, having means for reflecting panoramic views of open air scenes or interiors of buildings, in such a manner as to produce a picture upon an exposed plate, and means for precisely limiting such exposure during one complete revolution of the camera.

To attain these objects and advantages the invention consists in certain details of construction and combination of parts, substantially as herein illustrated, described and claimed.

Other objects and advantages of this invention will become apparent from the detailed description which now follows.

Referring to the accompanying drawings in which similar characters of reference designate corresponding parts, Figure 1 is a vertical sectional view of the camera with arrangement and construction of parts diagrammatically illustrated. Fig. 2 is a detail view of the mechanism for opening and closing the shutter. Fig. 3 is a detail view of the shutter. Fig. 4 is a detail view of the governor for controlling and limiting the speed of revolution. Fig. 5 is a detailed view of a coiled spring that constitutes the motive power of the revolving parts. Fig. 6 is a detail view of the part that engages with the ratchet portion of the frame and carries the spring. Fig. 7 is a detail view of the cone shaped reflector and the bracket which carries it in front of the lens. Fig. 8 is a detail view of the aperture through which the operator may view the screen for focusing. Fig. 9 is a detail view of that portion of the casing that carries the magnetic needle.

Referring more particularly to the drawings, numeral 1 designates the body of the camera, adapted to revolve when released by the operator. 2 is the base to which the tripod may be attached, and carries box 3, containing the mechanism which revolves the camera. Between base 2 and a flanged extension upon the bottom of box 3, a spring 4 is interposed, thereby holding box 3 in contact with adjusting screws 5, of which there are four, thus permitting the camera to be leveled independently of its tripod or other support. A frame 6, carrying a plate holder or focusing screen within the camera box, is rigid with box 3. A door 7, hinged to the camera box and closed by the slidable catch 8, is provided, through which a screen or plate holder may be passed.

A governor is provided, by which the speed and time of rotation of the camera box is controlled, and operates as follows: When released and set in motion, weights 9, having extensions 10 operating slidably in guide 11, are thrown outward by centrifugal force thereby moving shoes 13, to which they are connected by a thin spring-tempered circular band 12, into engagement with brake 14, having a beveled contact surface. Springs 15, hold the brake against an adjusting screw 16, provided with check-nut 17. A screw 18, bearing against brake 14, provides a means for starting and stopping the camera. Guide 11, is provided with a shaft carrying a small pinion 19, which engages pinion 20. A pinion 21, mounted on the same shaft with pinion 20, engages a circular rack 22 upon the bottom of the camera box, whereby the movement of said camera box is limited and controlled by the governor. Spring 23, connected to the bottom of the camera box and to a pinion 24, that revolves around a ratchet-toothed portion 25, of box 3, provides the motive power that operates the camera box. Pawls 26, carried by pinion 24, are held in engagement with the ratchet portion of the box by springs 27. Spring 23 has one end 29, engaging a pin 28, carried by pinion 24, and the opposite end is connected to collar 30 upon the bottom of box 1. 31 is a crank shaft operated by a detachable crank, and carries pinion 32 which engages with 24, to wind the spring. In a casing 33, rigidly secured to box 3, and projecting therefrom, a magnetic needle 34, is mounted, which will point in a direction coincident with the edges of frame 6, when opposite indicating mark 35. Therefore a plate or plate holder may be inserted in frame 6, and adjusted in accordance with the magnetic needle, or points of the compass. A circular track 36, disposed around box 3, engages pulley 37, upon the end of shutter lever 38, and providing a means whereby the shutter may be opened and closed for an exposure. A spring 40, working against member 39, in conjunction with links 41, operates shutter blades 42. The opening 43 in a partition within the camera box is for exposures.

The operation of the shutter is as follows: The camera box is placed in position with pulley 37 above track 36, and the camera is then started by removing the tension of screw 18 from the brake. As pulley 37 reaches point 44, of the circular track, the shutter is opened, and the track being higher at this point, raises lever 38, and holds the shutter open until point 45 is reached, when the shutter is closed by spring 40. The distance between points 44 and 45, is so graduated that the exposed plate shows no line between the beginning and end of the exposure, 46 holds the pulley upon lever 38, after it has left track 36.

47 represents spirit-levels, disposed upon box 1, whereby the same may be leveled for making an exposure.

48 is a prism by which the operator may view the screen for focusing. 49 is an aperture for the same purpose, being opened and closed by slide 50, which is operated by handle 51, through slot 52.

53 is a bracket carrying the cone shaped reflector 54, the lower ends of the bracket working slidably in slots, and having threads 55, which engage with collar 56, thereby allowing the adjustment of the reflector with the camera lens for the purpose of producing the entire view upon different sized plates in the same camera.

57 is a finger-piece provided for the operation of collar 56 by the fingers. A sleeve 58, is provided for focusing the lens.

In operation, the camera is placed upon a support or tripod in an elevated position and is then leveled by means of the adjusting screws in conjunction with the spirit-levels, and also adjusted to the points of the compass if desired, and reflector focused for making the desired view. The pulley on the shutter lever is placed above the track with which it will engage during the exposure, near point 44, whereby it will make nearly a complete revolution before the exposure begins. The camera box, being held from rotation by brake screw 18, is wound for exposure. A film or plate may then be placed in the camera, and with slide 50 closed, it is ready for exposure.

It will be seen that in making the exposure, the sky or top of the field of view, being reflected from the edge of the base of the cone reflector, will be printed upon the edge of the plate, while the fore-ground being reflected from the vertex point of the cone, will be printed from the center of the plate, thereby giving a topographic or bird's-eye view of all that can be seen from the view point of the camera.

From the foregoing description it will be seen that simple and efficient means are herein provided for accomplishing the objects of the invention, but while the elements shown and described are well adapted to serve the purposes for which they are intended, it is understood that the invention is not limited to the precise construction set forth, but includes within its purview such changes as may be made within the scope of the appended claims.

I claim:

1. In a device of the character described, the combination of a camera box, revoluble upon a base containing mechanism for actuating the camera box, a frame within the camera box adapted to carry a plate holder, and having rectangular edges and rigid connection with the base, an indicating mark upon the base, located in a plane midway between and parallel with two parallel edges of the frame, and a magnetic needle mounted within the base, which points in a direction coincident with the edges of the frame when opposite the indicating mark provided therefor, thereby allowing the adjustment of a plate or plate holder in accordance with the magnetic needle, or points of the compass.

2. An apparatus for producing topographic views, comprising a revoluble camera box and a mechanism within the base for actuating the camera box, comprising a circular rack upon the bottom of the camera box, a pinion engaging said rack, a revoluble pinion carrying a pin engaging with the spring, pawls on the pinion engaging a ratchet portion of the base, a pinion with a detachable crank engaging the pawl carrying pinion, a governor, a brake engaging with shoes on the revolving portion of the governor, an adjusting screw with check-nut, springs holding the brake in contact with the adjusting screw, and a screw within the adjusting screw for setting and releasing said brake.

3. An apparatus for producing topographic views, comprising a camera box revoluble upon a supporting base, mechanism within the supporting base for actuating the camera box, means for controlling the actuating mechanism, a cone reflector mounted above the camera box, means for adjusting the cone reflector, a plate holder within the camera box, rigidly connected to the supporting base, a partition within the camera box having an aperture therein, a shutter opening and closing the aperture, a spring actuating the shutter, a lever pivoted to the camera box, a link connecting the lever with the shutter, a pulley on the lever, and a circular track upon the base with which the pulley engages to open and close the shutter, substantially as shown.

4. An apparatus for producing topographic views, comprising a camera box revoluble upon a supporting base, mechanism within the supporting base for actuating the camera box, means for controlling the actuating mechanism, a cone reflector mounted above the camera lens, a partition within the camera box having a sector-shaped aperture therein, adapted to expose a portion of the camera plate, a prism mounted in the camera box for viewing the focusing screen, having a sliding cover therefor, and a spring actuated shutter and means for opening the shutter for one complete revolution of the camera box.

In testimony whereof, I affix my signature, in presence of two witnesses.

LOUIS HENRY KLEINSCHMIDT.

Witnesses:
 DAVID N. FERRIS,
 FREDERIC M. KEENEY.